(12) United States Patent
Terrell, II

(10) Patent No.: US 7,546,307 B2
(45) Date of Patent: Jun. 9, 2009

(54) VIRTUAL BLOCK STORAGE TO FILESYSTEM TRANSLATOR

(75) Inventor: James R. Terrell, II, Charlotte, NC (US)

(73) Assignee: Nvidia Corporation, Santa Clara, CA (US)

( * ) Notice: Subject to any disclaimer, the term of this patent is extended or adjusted under 35 U.S.C. 154(b) by 224 days.

(21) Appl. No.: 11/536,380

(22) Filed: Sep. 28, 2006

(65) Prior Publication Data

US 2008/0082488 A1    Apr. 3, 2008

(51) Int. Cl.
*G06F 17/00*    (2006.01)
(52) U.S. Cl. ....................... 707/101; 707/102
(58) Field of Classification Search .............. 707/101, 707/102; 709/217; 711/202, 203
See application file for complete search history.

(56) References Cited

U.S. PATENT DOCUMENTS

| | | | |
|---|---|---|---|
| 6,185,580 B1 * | 2/2001 | Day et al. .................. 707/205 |
| 6,961,739 B2 * | 11/2005 | Lee et al. .................. 707/205 |
| 7,206,915 B2 * | 4/2007 | DeSouter et al. ............ 711/203 |
| 7,266,555 B1 * | 9/2007 | Coates et al. ................. 707/10 |
| 7,333,993 B2 * | 2/2008 | Fair .......................... 707/100 |
| 2002/0091863 A1 * | 7/2002 | Schug ....................... 709/250 |
| 2007/0005740 A1 | 1/2007 | DiFalco et al. |
| 2007/0005741 A1 | 1/2007 | Hwang et al. |
| 2007/0055692 A1 * | 3/2007 | Pizzo et al. ............. 707/103 R |
| 2007/0079100 A1 * | 4/2007 | Shiga et al. ................. 711/170 |

* cited by examiner

*Primary Examiner*—Uyen T. Le

(57) ABSTRACT

A system for a block storage client to work with data blocks in a virtual filesystem (VFS) where the actual data for the data blocks is stored in a real filesystem (RFS). A virtual block mapping table caches references to the actual data in files and directory structures of the RFS. A read mapper then accesses the files and directory structures based on the cached references in the virtual block mapping table, and constructs the data blocks from the files or synthesizes them from the directory structures. And a VFS interface receive read requests from the client, directs the read mapper to prepare the data blocks, and provides the data blocks to the client.

27 Claims, 2 Drawing Sheets

VIRTUAL BLOCK STORAGE TO FILESYSTEM TRANSLATOR

TECHNICAL FIELD

The present invention relates generally to electrical computers and digital processing systems performing interprocess communication, and more particularly to means or steps for communication between application programs or operating systems and callable interfacing programs (i.e., device driver programs) which further facilitate communication or control of peripheral storage devices.

BACKGROUND ART

Legacy file systems, such as variants of the File Allocation Table (FAT) system, continue to enjoy wide acceptance. Even if not used as the main system storage format, such legacy file systems may still be implemented as a means of data interchange between computerized systems that normally use incompatible media formats.

Unfortunately, such legacy file systems are usually not optimized or able to be optimized for some modern storage media types, such as flash memory. Legacy file systems also tend to be limited in function by historical constraints which are no longer present in more modern file systems.

Thus, it becomes useful to implement virtual access to these legacy file systems while actually storing the data using a more optimal physical file format. This mapping between file system formats can be done using a network file system or some other abstraction that hides the physical format of the storage media from its clients. However, some remote data access and interchange mechanisms still must ultimately expose the storage media format to the client. For example, the USB Mass Storage Class protocol and the iSCSI network storage protocol expose storage media at the block allocation level. Consequently, only physical storage formats understood by both the remote client and the local storage devices can be used, leading to a prevalence of FAT-formatted file systems in the presently available local storage devices, even when such a format is not optimal for the actual storage media on the device.

Furthermore, exposing the storage media at the block (instead of file system) level hides the file system operations from the storage device. If the device then needs to do maintenance operations related to file additions, changes, or deletions, it has to compare the state of the file system before and after the block operations are performed in order to determine if files have been changed. An example of this is a USB device that exposes its storage media over the Mass Storage Class protocol while also maintaining a database of media files that are stored in the file system. A remote USB host using the device's storage media in block mode may not know how to update the database when files are added or deleted, so the entire media needs to be rescanned and the database rebuilt after every USB session completes. This can be a very time-intensive operation for large storage media.

FIG. 1 (background art) is a block diagram illustrating the problems noted above. A computerized system 10 includes a host or client 12, a storage server 14, and a communications link 16 between the client 12 and the storage server 14. Typically, although not necessarily, the client 12 and the storage server 14 are somewhat "remote" from each other, usually by at least a few inches or tens of centimeters.

For example, the client 12 may be a personal computer (PC), the storage server 14 may be an external hard drive or "thumbnail" flash memory unit, and the communications link 16 may be an USB Mass Storage Class or iSCSI network storage.

The client 12 includes an operating system filesystem (OS FS 18) (e.g., a Windows™ filesystem), a legacy filesystem 20 (e.g., a FAT filsesystem), and a first network filesystem interface 22. For the sake of comparison, a legacy local storage 24 is also shown (e.g., a hard drive formatted with the FAT filesystem).

The storage server 14 includes a second network filesystem interface 26, a local filesystem controller 28, and sectored or block storage media 30. In particular, the network filesystem interfaces 22, 26 here must be able to work with the protocol (i.e., a legacy filesystem 20) being employed across the communications link 16—because there is no mechanism in this scheme to permit otherwise.

Accordingly, to eliminate the need to use FAT or other legacy file systems and to offer the opportunity to map operations at the block device level to equivalent file system operations, what is needed is a way to expose a virtual legacy format, such as FAT, on a storage device that actually uses another, presumably more optimal, file system for its physical media format.

DISCLOSURE OF INVENTION

Accordingly, it is an object of the present invention to provide a system to map block-level accesses in a virtual file system to the storage media in an actual physical file system.

Briefly, one preferred embodiment of the present invention is a system for a block storage client to work with data blocks in a virtual filesystem (VFS) where the actual data for the data blocks is stored in a real filesystem (RFS). A virtual block mapping table caches references to the actual data in files and directory structures of the RFS. A read mapper accesses the files and the directory structures based on the cached references in the virtual block mapping table, and constructs the data blocks from the files or synthesizes them from the directory structures.

And a VFS interface receives read requests from the client, directs the read mapper to prepare the data blocks, and provides the data blocks to the client.

Briefly, another preferred embodiment of the present invention is a method for a block storage client to work with data blocks in a virtual filesystem (VFS) when the actual data for the data blocks is stored in a real filesystem (RFS). In response to a read request from the client, cached references to the actual data in files and directory structures of the RFS are accessed. Then the data blocks are constructed from the files, or synthesized from the directory structures. And the data blocks are provided to the client.

These and other objects and advantages of the present invention will become clear to those skilled in the art in view of the description of the best presently known mode of carrying out the invention and the industrial applicability of the preferred embodiment as described herein and as illustrated in the figures of the drawings.

BRIEF DESCRIPTION OF THE DRAWINGS

The purposes and advantages of the present invention will be apparent from the following detailed description in conjunction with the appended figures of drawings in which.

In the various figures of the drawings, like references are used to denote like or similar elements or steps.

BEST MODE FOR CARRYING OUT THE INVENTION

Figure 1:
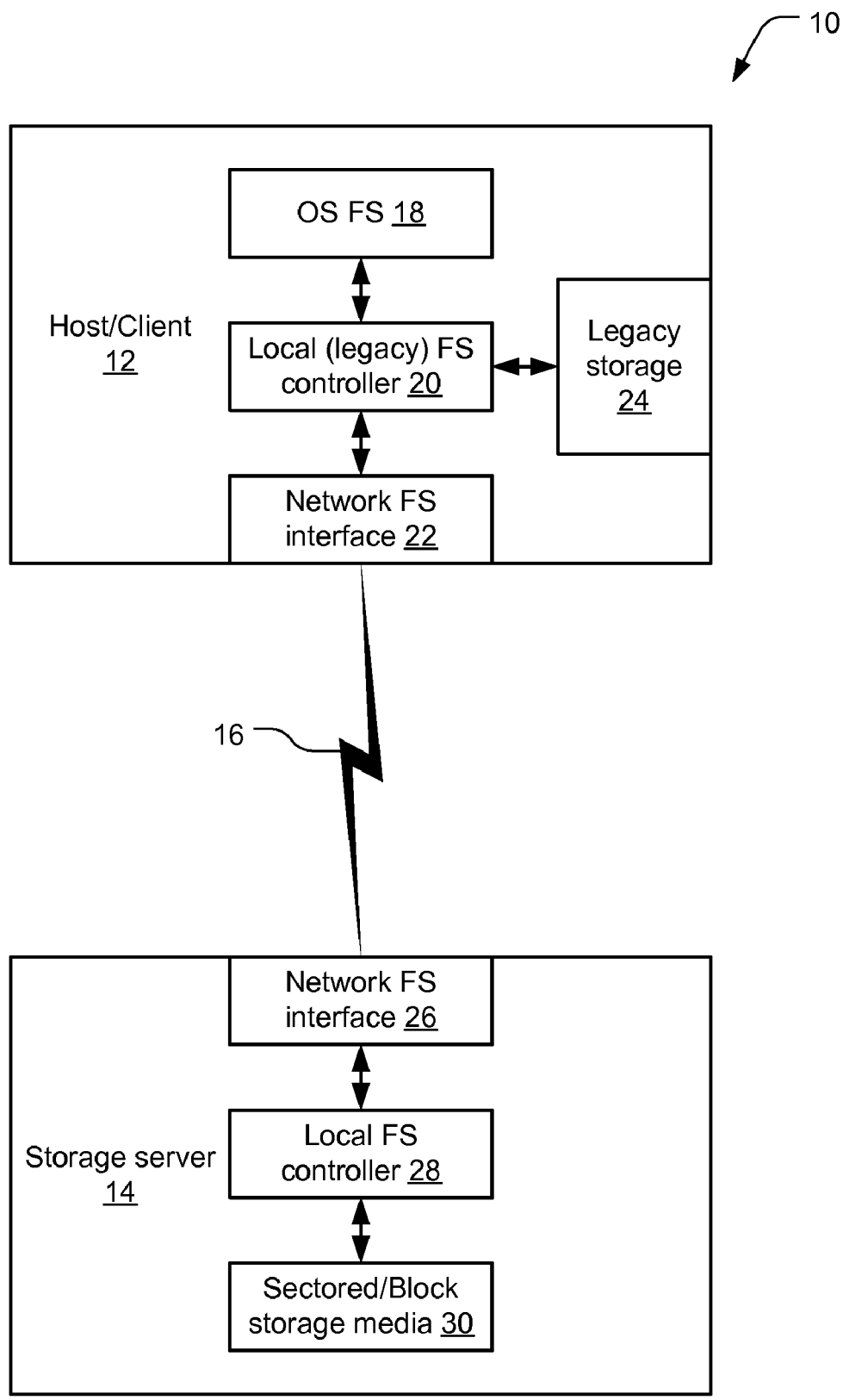
FIG. 1 (background art) is a block diagram illustrating the use of a legacy filesystem between a storage client and a storage server.

A preferred embodiment of the present invention is a system to map block-level accesses in a virtual file system to the storage media in a real file system. As illustrated in the various drawings herein, and particularly in the view of FIG. 2, preferred embodiments of the invention are depicted by the general reference character 100.

Figure 2:
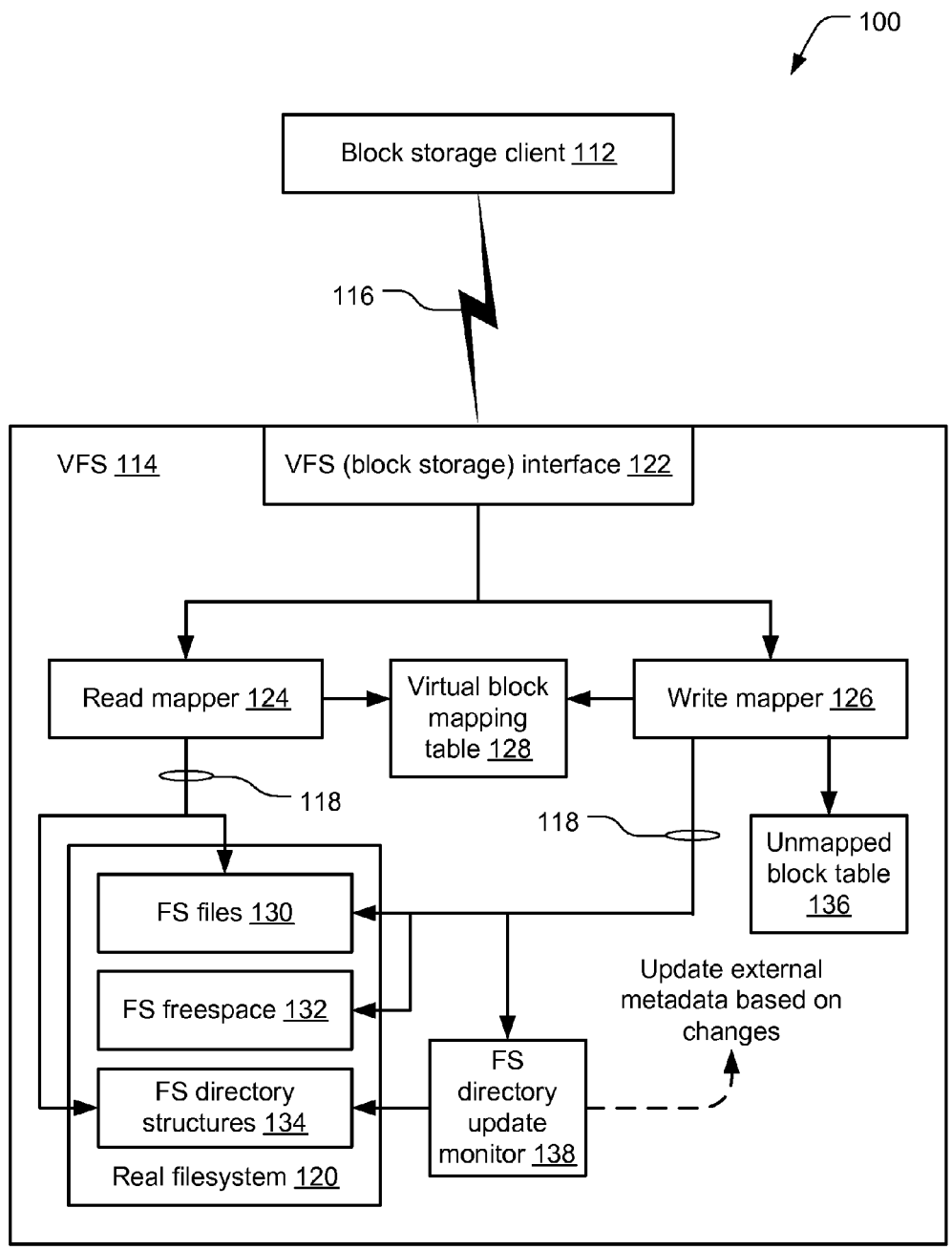
FIG. 2 is a block diagram schematically depicting the major elements and signal paths of a filesystem translator in accord with the present invention.

FIG. 2 is a block diagram schematically depicting the major elements and signal paths of a filesystem translator 100 in accord with the present invention. Briefly, a block storage client 112 reads and (optionally) writes data blocks in a virtual file system (VFS 114). The client 112 employs a first access protocol 116 to communicate with the VFS 114, and the VFS 114 employs a second access protocol 118 to read and write the data blocks in a real file system (RFS 120).

For example, the client 112 may be a personal computer (PC), the first access protocol 116 may be the iSCSI or the USB Mass Storage Class protocol, the second access protocol 118 may be proprietary, and the RFS 120 may be a "thumb drive" type flash memory unit. To the client 112, the VFS 114 appears to be a block storage device formatted with an industry standard, such as FAT or FAT32, yet the actual format of the RFS 120 may be quite different, for instance, a format optimized for the particular flash memory technology or end application.

As shown in FIG. 2, what the client 112 "sees" is a VFS interface 122, and this VFS interface 122 works with a read mapper 124 and an optional write mapper 126 and other optional write related elements described presently. The read mapper 124 and the write mapper 126 then work with a virtual block mapping table 128 and the RFS 120.

The RFS 120 typically divides the storage media into filesystem files 130, filesystem free space 132, and filesystem directory structures 134 that make it possible to locate files and their attributes within the actual storage media. The RFS 120 itself can be entirely conventional, although a major advantage of the inventive filesystem translator 100 is that non-conventional and new technologies can be used in the RFS 120 and now be used by clients 112 that have not been designed to handle these.

The read mapper 124 handles data block read requests in the VFS 114, returning data blocks that come from the filesystem files 130 or which are synthesized from the filesystem directory structures 134 of the RFS 120. When creating and returning such data blocks, the read mapper 124 refers to the virtual block mapping table 128, which caches references to the actual data in the RFS 120 that is needed to create the data blocks. For example, directory entry sectors or allocation table clusters in the VFS 114 can be translated from filesystem directory structures 134 that have been cached by the virtual block mapping table 128.

The write mapper 126 handles block write requests in the VFS 114, converting the data blocks into write operations to the RFS 120. The write mapper 126 also refers to and updates the virtual block mapping table 128 as the client 112 writes to the VFS 114. In some cases, the client 112 may update the VFS 114 "out of order" (see below) causing some block writes to have ambiguous mapping in the RFS 120. For instance, when creating a new file, the client 112 might write a file of data to previously free virtual blocks before updating directory or allocation table entries to point to the newly written blocks. The write mapper 126 therefore can use an unmapped block table 136 to keep track of these "ambiguous" writes until future writes can be used to resolve the identities and relationships of the previously written virtual blocks.

Write operations in the VFS 114 that resolve to directory updates have special significance. A filesystem directory update monitor 138 can watch for file additions and deletions, and then updated external metadata based on the filesystem directory changes.

There are several possible primary operational modes for the VFS 114, each with varying levels of utility and implementation complexity. Snoop-only, Read-only, and Read/Write Separated are some examples described below.

In the VFS Snoop-only Mode the purpose is to watch block activity to the VFS 114 and extract file-system-related operations which can be logged for later use. In this mode the first access protocol 116, between by the client 112 and the VFS interface 122, and the second access protocol 118, between the read mapper 124 and the RFS 120, are identical. In fact, the second access protocol 118 can be exposed directly to the client 112. However, the write mapper 126 (also using the second access protocol 118) and the filesystem directory update monitor 138 are implemented so that file updates can be detected and logged or monitored.

The VFS Read-only Mode is used if the client 112 needs only read-only access, all of the write management components (126, 136, 138) then are not needed and can be left out of the VFS 114.

The VFS Read/Write Mode is the full implementation of the filesystem translator 100. It requires all components described above, or equivalents, and it allows the client 112 full read-write access through the VFS interface 122 to the underlying RFS 120.

When using the full VFS Read/Write Mode, ambiguous VFS write management may be necessary because the client 112 may update the VFS 114 in such a way that some block writes are ambiguous and cannot be mapped directly to updates in the RFS 120, at least not immediately. For example, this can happen due to the client 112 optimizing the write order it employs by using a write-behind cache, or in the course of implementing a storage transaction rollback strategy.

The unmapped block table 136 permits tracking such ambiguous block writes, but there is still the matter of storing the data that is in the written blocks themselves. One simple solution for this is to save all of the ambiguous write data in a memory (e.g., a cache within the write mapper 126) and to not update the RFS 120 until the ambiguous block write mappings are resolved, if ever. However, this approach can be unworkable if the data writes are essentially unbounded in size. As it turns out, however, applying some simple rules permits storing such data in the RFS 120 itself until mapping of the data has been resolved:

If a write is made to a previously unused virtual block, it can be assumed that a new file or directory structure is being written. The data can then be stored in a new file in the RFS 120.

Long, sequential updates to free space in the VFS 114 can be initially interpreted as a new file or files being written. This makes it easier to convert the stored data into actual files after the block mapping is resolved.

Special-purpose remapping operations also can be supported by the RFS 120, in order to rearrange file and directory structures in-place after block mapping is resolved. For example, a long sequence of writes to free space might contain multiple files and interleaved directory structures. These can be stored in the RFS 120 as a single contiguous file which is later broken into directories and individual files. Allowing the large file to be broken apart in place and redistributed to different files and functions is much more efficient compared to copying the file to the multiple destinations, then deleting it.

Finally, providing security is often a concern in modern data storage systems and the inventive filesystem translator 100 can handle this as well. Security policies of a particular RFS 120 can be treated as a special case of normal file system attribute translation and mapping. If the RFS 120 implements security, then its policies should be virtualized by the VFS interface 122, as with all attributes. This virtualization can be handled by the read mapper 124 and the write mapper 126, if the latter is present, and can take any of several forms depending on the capabilities available in the particular VFS 114.

For example, if the VFS 114 does not support sufficient security facilities, secure elements of the RFS 120 can then simply be ignored and are not virtualized for either read or write access.

Alternately, if the VFS 114 supports the same or greater security facilities as the RFS 120, it should then be possible to translate the security capabilities of the RFS 120 into an equivalent (or more secure) facility in the VFS 114 and thus in the filesystem translator 100. Although possible, this may not be without significant system overhead as the data blocks in the RFS 120 may need to pass through additional decryption and encryption phases within the context of reads and writes in the filesystem translator 100.

While various embodiments have been described above, it should be understood that they have been presented by way of example only, and that the breadth and scope of the invention should not be limited by any of the above described exemplary embodiments, but should instead be defined only in accordance with the following claims and their equivalents.

INDUSTRIAL APPLICABILITY

The present filesystem translator 100 is well suited for application in modern system where it is desirable to have a storage client 112 employing a first access protocol 116 able to use a virtual file system (VFS 114) employing a second access protocol 118 to read and write data blocks in a real file system (RFS 120).

One benefit of the filesystem translator 100 is that it makes it possible to use the most efficient file system for a particular type of storage media, while making that media appear to be a popular standard format. The VFS 114 provides a virtual block media view of information appearing to be in a general filesystem, while the actual data is in the RFS 120.

For example, the filesystem translator 100 permits the common FAT filesystem to be used over a USB Mass Storage Class device or other interface, while the data is actually stored in a flash filesystem or other format. As is well known, the FAT filesystem works well with particular sizes and access needs for data blocks in typical magnetic hard disk drive type storage media. It also works well with extents, obtaining contiguous data blocks and dedicating them to specific uses. Flash type storage media, however, uses much different data block sizes and does not have appreciable I/O delays when the data is fragmented or lacks contiguity, but it has other media-specific concerns, like limiting the number of writes per cell in write-heavy file applications ("wear leveling") and reduced performance when using extents. The filesystem translator 100 thus permits legacy filesystems to be used with new and emerging types of storage media.

The filesystem translator 100 is able to provide several operational modes, each with varying levels of utility. As described above, very simple embodiments of the VFS 114, including only the VFS interface 122, the read mapper 124, and the virtual block mapping table 128 permit Read-Only Mode access to the RFS 120.

The filesystem translator 100 can provide number of variations of Read/Write Mode access to the RFS 120. The simplest variation here adds just the write mapper 126 to what is used for the Read-Only Mode. This may not, however, handle some sophisticated write scenarios. Then more sophisticated variations of the filesystem translator 100 can be employed.

For example, the client 112 may write blocks of data out-of-order or it may perform block writes that are initially ambiguous (or sometimes even never resolved). A variation of the filesystem translator 100 with the unmapped block table 136 can be employed to track the ambiguous blocks and permit their "lazy" resolution.

Adding the directory update monitor 138 permits all file updates to be detected and logged or monitored. In particular, special-purpose remapping operations can be supported. It becomes possible now to monitor for updates to virtual directory blocks, in order to track files that have been added or updated. Data-in-stream operations by the client 112 can be monitored, so the data can be treated accordingly in anticipation of how it will likely be resolved eventually. For instance, directory format operations requested by the client 112 can be used to hint that a new folder is being written in the midst of a large data stream of virtual block writes. In-place redistribution of large files amongst several smaller files and directory structures can be supported, without requiring the data to be recopied. And database updates can be overlapped with data transfer operations, instead of rescanning and rebuilding the database after the media has been unmounted, as is done currently.

Finally, a particularly novel and useful operational mode of the inventive filesystem translator 100 is the Snoop-only Mode. Unlike the other modes described, where the first access protocol 116 and the second access protocol 118 will typically be different, in the Snoop-only Mode they are identical. This permits file-system related operations to be logged for later review, for example, to diagnose or optimize filesystem operations.

For the above, and other, reasons, it is expected that the filesystem translator 100 of the present invention will have widespread industrial applicability and it is therefore expected that the commercial utility of the present invention will be extensive and long lasting.

The invention claimed is:

1. A method of implementing a virtual file system, said method comprising:
   accessing a read request for a first portion of data, wherein said read request is associated with a first file system;
   accessing at least one cached reference for mapping said first portion of data to a second portion of data stored in a first memory in accordance with a second file system;
   accessing said second portion of data based upon said at least one cached reference; and
   formatting said second portion of data in accordance with said first file system to generate said first portion of data.

2. The method of claim 1 further comprising:
   communicating said first portion of data to a component associated with said read request.

3. The method of claim 1 further comprising:
   communicating said first portion of data using a first protocol, and wherein said accessing said second portion of data further comprises accessing said second portion of data using a second protocol.

4. The method of claim 1 further comprising:
accessing a write request for a third portion of data, wherein said write request is associated with said first file system;
formatting said third portion of data in accordance with said second file system to generate a fourth portion of data; and
storing said fourth portion of data in said first memory in accordance with said second file system.

5. The method of claim 4 further comprising:
generating at least one additional cached reference for mapping read requests associated with said third portion of data to said fourth portion of data stored in said first memory.

6. The method of claim 1 further comprising:
prior to generation of said at least one cached reference, storing location information in a second memory separate from said first memory, wherein said location information comprises information about a location of said second portion of data;
determining a relationship between said second portion of data and said first portion of data; and
generating said at least one cached reference based upon said relationship.

7. The method of claim 1, wherein said accessing a read request further comprises accessing a read request for said first portion of data using a first access protocol, wherein said accessinci said second portion of data further comprises accessing said second portion of data using a second access protocol, wherein said first access protocol is identical to said second access protocol, and further comprising:
monitoring and logging operations related to said first and second file systems using said second access protocol.

8. The method of claim 1 further comprising:
in response to a change in an organization of said second portion of data, updating external metadata based upon said change.

9. The method of claim 1, wherein said first and second portions of data comprise secure information, and wherein said accessing said second portion of data and said formatting said second portion of data are performed using security mechanisms to maintain security of said first and second portions of data.

10. A system comprising:
a client component operable to access data in accordance with a first file system;
a file system component comprising data stored in accordance with a second file system;
an interface component operable to access a read request from said client component for a first portion of data; and
a read component coupled to said interface component, said read component operable to access at least one cached reference for mapping said first portion of data to a second portion of data stored in a first memory portion of said file system component, wherein said read component is further operable to access said second portion of data based upon said at least one cached reference, and wherein said read component is further operable to format said second portion of data in accordance with said first file system to generate said first portion of data.

11. The system of claim 10, wherein said interface component is further operable to communicate said first portion of data to said client component.

12. The system of claim 10, wherein said interface component is further operable to communicate said first portion of data to said client component using a first access protocol, wherein said read component is further operable to access said second portion of data from said file system component using a second access protocol, and wherein said first access protocol is different from said second access protocol.

13. The system of claim 10, wherein said interface component is further operable to access a write request from said client component for a third portion of data, and further comprising:
a write component coupled to said interface component, said write component operable to format said third portion of data in accordance with said second file system to generate a fourth portion of data, and wherein said write component is further operable to store said fourth portion of data in said first memory portion in accordance with said second file system.

14. The system of claim 13, wherein said write component is further operable to generate at least one additional cached reference for mapping read requests associated with said third portion of data to said fourth portion of data stored in said first memory portion.

15. The system of claim 10 further comprising:
a monitoring component, wherein said monitoring component, prior to generation of said at least one cached reference, is operable to store location information in a second memory portion separate from said first memory portion, wherein said location information comprises information about a location of said second portion of data, wherein said monitoring component is further operable to determine a relationship between said second portion of data and said first portion of data, and wherein said monitoring component is further operable to generate said at least one cached reference based upon said relationship.

16. The system of claim 10 further comprising:
a monitoring component;
wherein said interface component and said client component communicate using a first access protocol, wherein said read component and said file system component communicate using a second access protocol; and
wherein said first access protocol is identical to said second access protocol for enabling said monitoring component to monitor and log operations related to said first and second file systems.

17. The system of claim 10 further comprising:
a monitoring component, wherein said monitoring component, in response to a change in an organization of said second portion of data, is operable to update external metadata based upon said change.

18. The system of claim 10, wherein said first and second portions of data comprise secure information, and wherein said interface component and said read component are operable to implement security mechanisms for maintaining security of said first and second portions of data.

19. A system comprising:
an interface component operable to access a read request for a first portion of data, wherein said read request is associated with a first file system; and
a read component coupled to said interface component, said read component operable to access at least one cached reference for mapping said first portion of data to a second portion of data stored in a first memory portion in accordance with a second file system, wherein said read component is further operable to access said second portion of data based upon said at least one cached reference, and wherein said read component is further operable to format said second portion of data in accordance with said first file system to generate said first portion of data.

20. The system of claim 19, wherein said interface component is further operable to communicate said first portion of data to a component associated with said read request.

21. The system of claim 19, wherein said interface component is further operable to communicate said first portion of data using a first access protocol, wherein said read component is further operable to access said second portion of data using a second access protocol, and wherein said first access protocol is different from said second access protocol.

22. The system of claim 19, wherein said interface component is further operable to access a write request for a third portion of data, wherein said write request is associated with said first file system, and further comprising:

a write component coupled to said interface component, said write component operable to format said third portion of data in accordance with said second file system to generate a fourth portion of data, and wherein said write component is further operable to store said fourth portion of data in said first memory portion in accordance with said second file system.

23. The system of claim 22, wherein said write component is further operable to generate at least one additional cached reference for mapping read requests associated with said third portion of data to said fourth portion of data stored in said first memory portion.

24. The system of claim 22 further comprising:

a second memory portion for storing information about a location of said second portion of data, wherein said second memory portion is separate from said first memory portion; and wherein said write component is further operable to determine a relationship between said second portion of data and said first portion of data, and wherein said write component is further operable to generate said at least one cached reference based upon said relationship.

25. The system of claim 19 further comprising:

a monitoring component;

wherein said interface component is further operable to communicate said first portion of data using a first access protocol, and wherein said read component is further operable to access said second portion of data using a second access protocol; and wherein said first access protocol is identical to said second access protocol for enabling said monitoring component to monitor and log operations related to said first and second file systems.

26. The system of claim 19 further comprising:

a monitor component for monitoring changes in an organization of said second portion of data, said monitor component further for updating external metadata based upon a change in said organization of said second portion of data.

27. The system of claim 19, wherein said first and second portions of data comprise secure information, and wherein said interface component is further operable to implement security mechanisms for maintaining security of said first and second portions of data.

* * * * *